Dec. 13, 1960 E. L. MACKEY 2,964,610
APPARATUS FOR ELECTRIC WELDING
Filed Aug. 16, 1957 3 Sheets-Sheet 1

INVENTOR.
EUGENE L. MACKEY
BY
Oberlin + Limbach
ATTORNEYS

Dec. 13, 1960  E. L. MACKEY  2,964,610
APPARATUS FOR ELECTRIC WELDING
Filed Aug. 16, 1957  3 Sheets-Sheet 2
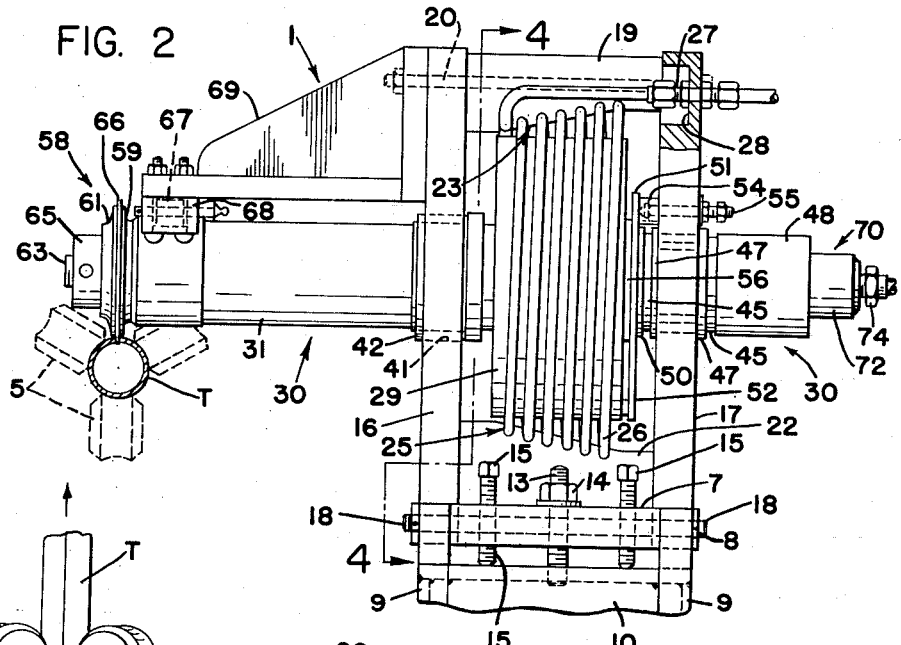
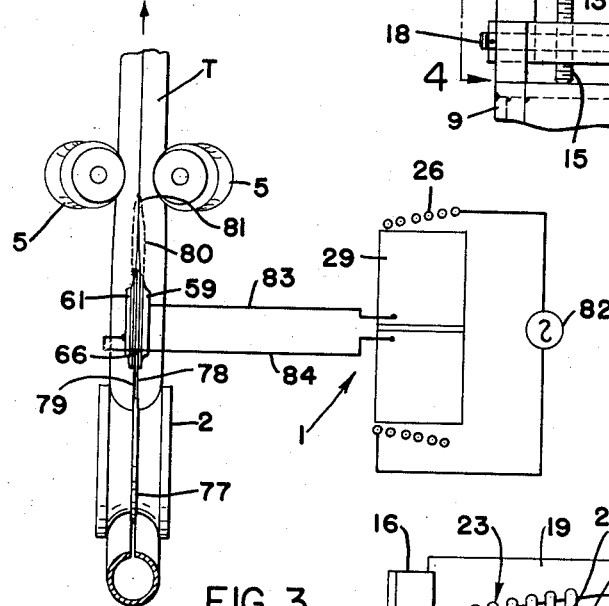
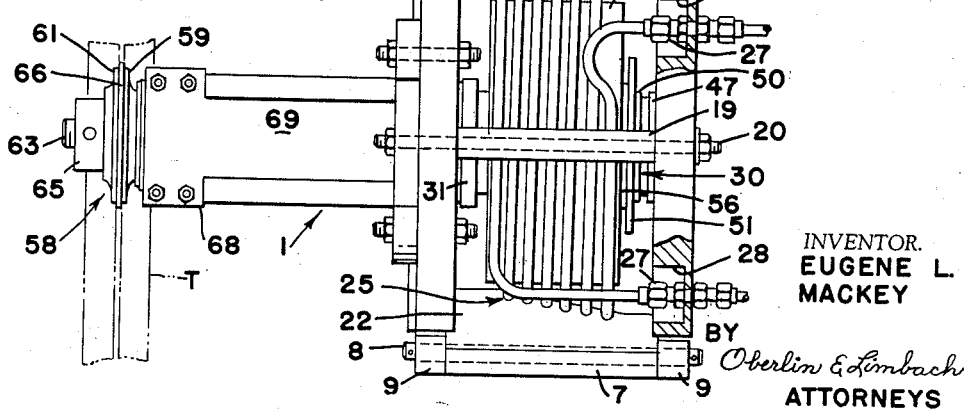
INVENTOR.
EUGENE L. MACKEY
BY Oberlin E Limbach
ATTORNEYS Dec. 13, 1960
E. L. MACKEY
2,964,610
APPARATUS FOR ELECTRIC WELDING
Filed Aug. 16, 1957
3 Sheets-Sheet 3
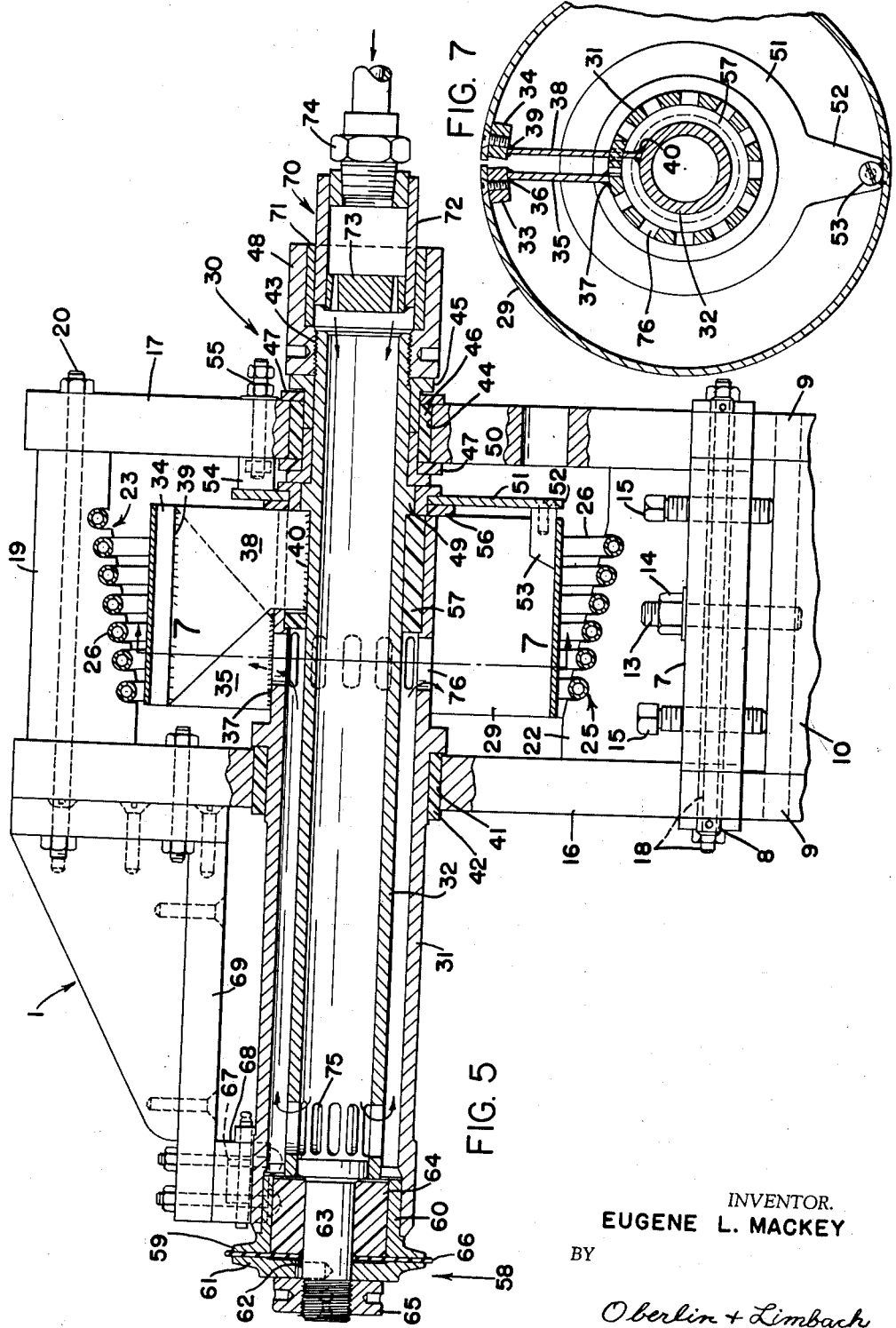
INVENTOR.
EUGENE L. MACKEY
BY
Oberlin + Limbach
ATTORNEYS

United States Patent Office

2,964,610
Patented Dec. 13, 1960

2,964,610

APPARATUS FOR ELECTRIC WELDING

Eugene L. Mackey, Fairview Park, Ohio, assignor to The Yoder Company, Cleveland, Ohio, a corporation of Ohio Filed Aug. 16, 1957, Ser. No. 678,557

10 Claims. (Cl. 219—63)

This invention relates to a method of electric welding particularly adapted for use in the continuous production of welded tubing and to apparatus for the practice of such method.

As is well-known, commercial manufacture of electrically welded tubing is accomplished in mills operative to form flat strips to the desired tubular shape and then weld the resultant opposed seam edges together by the application of electric energy thereto. For some time, the standard procedure has been to apply the energy to the moving blank at or beyond the point where the converging edges meet and in such manner as to cause current to flow transversely through the closed seam wall section, the interface at the seam having a high resistance to current flow and being heated thereby to the temperature for fusion of the particular metal. This is perhaps still the most prevalent type of welding operation used, but a different technique, utilizing high frequency energy, has lately been introduced with significant success, the current in such scheme being caused to flow around the crotch in the blank, that is, for a predetermined distance in the spaced, converging edge portions and about the junction of the same. With high frequency alternation, the resulting skin effect concentrates the flow in the edge faces, whereby extremely high current densities are produced at the point of closure of the seam, permitting very high rates of production with uniformly good weld quality.

My invention is concerned with this last concept of welding, with one of its main objects being to provide for application of the high frequency energy to the work in a novel and improved manner.

It is another object of the invention to provide comparatively inexpensive, yet reliably efficient, method and apparatus for transferring the energy to the moving tubular blank or other work through positive physical contact therewith. A further object is to provide such mechanical transference of the energy by novel contactor means so constructed and operative as to afford good electrical contact with the work and ready control of the contact zone to establish and maintain the proper relationship of the same to the converging seam, and having especially good wearing qualities for efficient operation over long periods of use.

It is an additional object of the invention to provide a new high frequency welder, adapted for the use noted above, in which an output transformer and contact assembly are so combined that rolling contact with the work may be had, while the contactor assembly and transformer secondary are in rigid physical connection for efficient high frequency energization of the former by the latter.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 2 is a side elevation of such apparatus;

Fig. 3 is a top view thereof;

Fig. 5 is a further side view of the welder on an enlarged scale and with the central portion thereof shown in longitudinal section;

Fig. 7 is a vertical section as viewed from the plane of the line 7—7 in Fig. 5; and Fig. 8 is a diagrammatic view serving to show the manner in which the apparatus is operative to weld the seam of an advancing tubular blank.

Figure 1:
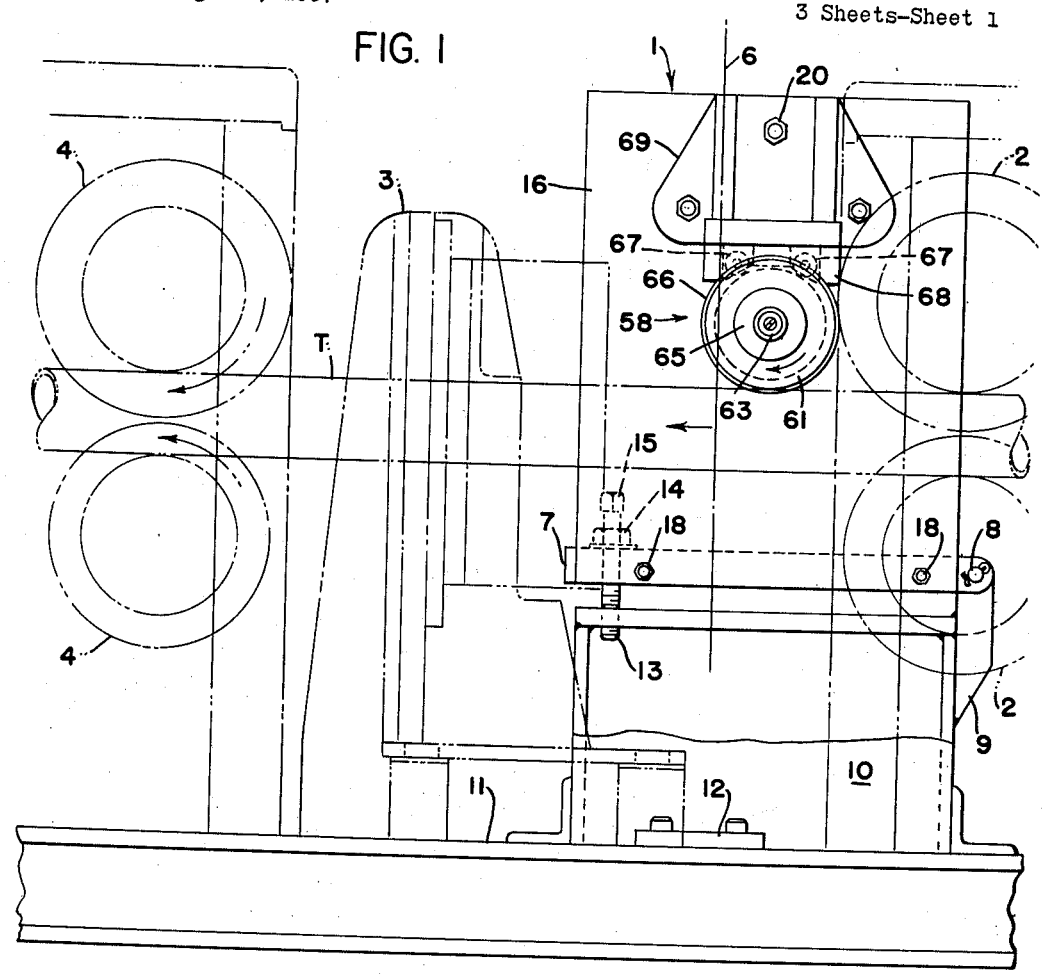
Fig. 1 is a front elevation of welding apparatus in accordance with the present invention, as it would appear in a tube mill and with the adjacent cooperative units of the latter indicated by dashed lines.

Referring now to the drawings in detail, the illustrated apparatus embodiment of the invention is of course intended for incorporation in a tube forming mill including a number of conventional roll passes for shaping a longitudinally advancing flat strip to tubular form and means for pressing the resulting seam edges together. Since it is my intention, as discussed in the above, to heat the blank for welding by current flow along the converging edges and around the point of junction thereof, the welding apparatus is located between the last roll pass and the squeeze unit as illustrated in Fig. 1, wherein reference numeral 1 designates the welder generally, the rolls of the last forming pass, i.e., just before the welder, are indicated by the dashed outline 2, and 3 is a dashed outline of a squeeze roll assembly immediately following the welder. The rolls of a subsequent sizing pass have also been outlined at 4, while T designates a tubular blank as it passes through this section of the mill, in the direction of the arrow.

It will be understood that the roll passes are of conventional design, and the outline 3 is actually that of the squeeze roll unit fully disclosed in Crawford application Serial No. 493,267, filed March 9, 1955, the same comprising three rolls adapted to bear against substantially the entire periphery of the blank T, as shown by the outlines 5 in Fig. 2. For simplicity, such rolls have been indicated in this figure, rather than in Fig. 1, with, however, the line 6 in the latter view indicating the centerline of such rolls. These units thus do not form a part of the present invention, and need not be described or shown here in detail, but the representation thereof which has been included will materially assist in explaining and understanding the new welding apparatus and especially the manner in which it is operative.

Such welding apparatus, then, comprises a table 7 hinged along one edge on a shaft 8 which is supported horizontally near its ends by lugs 9 projecting upwardly from a base 10 in the form of a box made of welded plate. The base is mounted on a frame or bed 11, against a locating block 12, with the shaft at right angles to the path of movement of the tubular blank T through the apparatus. For a purpose which later will be more apparent, the table 7 can thus be swung about the axis of shaft 8, the latter being spaced above the top of the base, and at the opposite free edge of the table, a positioning screw 13 is threaded through the same and through the base top. Adjustment of this screw will obviously vary the inclination of the table 7 with respect to the base 10, a nut 14 being provided to hold the former in various of such adjusted conditions, and two set screws 15 are threaded through the table to either side of the screw 13 to bear against the base top and thereby support the table tightly at the adjusted inclination.

Figure 4:
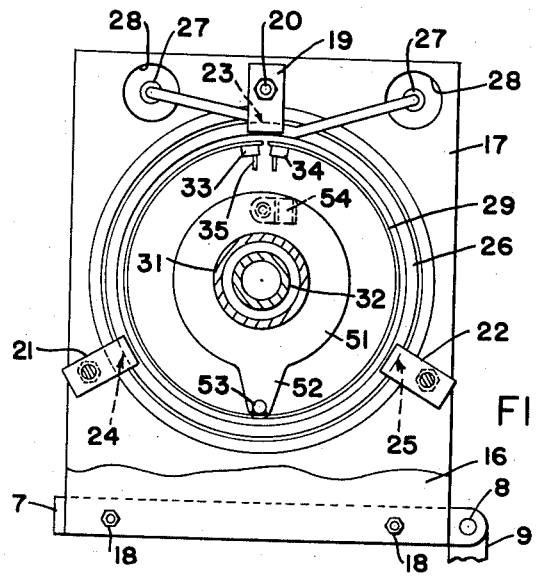
Fig. 4 is a vertical section taken along the line designated 4—4 in Fig. 2.
Figure 6:
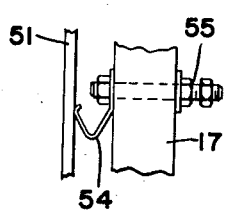
Fig. 6 is a fragmentary view illustrating a detail of the construction.

The front and rear edges of the table are recessed to receive the bottom portions of a front housing plate 16 and a rear housing plate 17, respectively. These plates are in vertical parallel planes and secured partially in such disposition by two tie bolts 18 extending from front to rear through the bottom portions of the same and the table 7 therebetween. At the top center, the plates are held against the ends of a spacer 19 by a tie bolt 20 and spaced 120° to each side of this top spacer, there are two more similarly secured spacers 21 and 22, with all three being radially disposed relative to a common axis (Fig. 4). In Figs. 2 and 5, the spacer 22 shown at the bottom has been rotated 30° out of its proper position for convenience of illustration.

The inner edges of the three such spacers correspondingly slope to the rear and each is formed with a series of notches, indicated at 23, 24 and 25, respectively, to receive and space the turns of a spirally wound coil 26. This coil is formed of copper tubing, through which water may be circulated for cooling, and its ends are brought to terminals 27 provided in sockets 28 in the rear housing plate 17, near the top thereof.

The coil 26 forms the primary winding of a high frequency transformer, and the secondary winding is a single turn coil formed by a split sleeve 29. The latter is supported within the primary coil 26 on a hollow shaft assembly designated generally by reference numeral 30 and comprising an outer tubular conductor 31 and an inner tubular conductor 32 in spaced relation.

As shown most clearly in Fig. 7, bars 33 and 34 are secured to the inner surface of the secondary coil 29 respectively at the sides of the split or gap therein, thus forming terminal pieces at the electrical ends of the coil. A contact plate 35 is welded along one of its edges 36 to the bar 33 and extends inwardly to abut the outer tube or shaft 31 to which it is again secured by welding. The lower edge 37 of this plate, as shown in Fig. 5, is of reduced axial extent, and a second contact plate 38 is similarly secured along an outer edge 39 to the bar 34 and at an inner edge 40 to the inner tubular conductor 32, a slot being provided in the outer shaft 31 for passage, without contact, of the plate 38 to the inner shaft. In this manner, the inner and outer shafts are electrically rigidly connected to the output terminals of the high frequency transformer.

The outer shaft 31 extends from the rear plane of the secondary coil 29 forwardly through an opening 41 provided therefor in the front housing plate 16 and is rotatably supported in such opening by a bushing 42. The inner hollow shaft 32 commences in a threaded portion 43 behind the rear plate 17 and extends through an opening 44 in the same at which it is rotatably supported by an axially split flanged bushing 45 and an encircling sleeve bushing 46. Thrust washers 47 are disposed respectively between the flanges of bushing 45 and end faces of bushing 46 to overlie the plate surfaces at each side of the aperture. A combination sleeve and nut 48 is threaded on the end of the shaft 32 against the outer end of the flanged bushing 45.

Just before the inner shaft passes into the outer shaft, the former has a peripheral band 49 about which there is a flanged bushing 50 seating a ground collector ring 51, shown most clearly in Fig. 7. Such ring has an ear 52 fastened to a block 53 which is welded to the inner surface of the secondary coil 29, and a small spring plate 54 bolted at 55 to the rear housing plate is disposed to contact the collector ring as the same rotates.

The flanged bushing 50 also supports a thrust washer 56 positioned between the ground collector ring 51 and the inner or rear end of the outer shaft 31, and the portion of the latter adjacent such end is supported on a fairly long sleeve bushing 57 between the same and the inner shaft. Both shafts project forwardly, in spaced and hence insulated relation, an appreciable distance beyond the front housing plate 16 and support a contactor assembly designated generally by reference numeral 58.

This contactor assembly comprises an inner rotary electrode 59 having a hollow hub 60 which fits within the end of the outer shaft 32, and an outer rotary electrode 61 keyed by a pin 62 on a solid axial extension 63 welded to the end of the inner shaft 32, such end being spaced inwardly from the outer end of the outer shaft. A bushing 64 is disposed between the hub 60 of the outer electrode and the extension 63, and a spanner nut 65 is threaded on the projecting end of such extension against the outer electrode 61. The two electrodes are spaced apart by a disc of insulating material 66 of greater diameter which thus not only separates the two electrically but serves as a seam guide. The radial projection of this disc is preferably slightly tapered in section as illustrated to facilitate insertion between and guiding of the seam edges. The various bushings are of course all made of insulating material.

Near its outer end, the outer shaft 31 is engaged by two back-up rolls 67 freely rotatable in a block 68 carried by a bracket 69 which is secured to the face of the front housing plate 16. The welding rolls or electrodes 59 and 61 are intended to bear against the tubular blank to be welded at their lowermost portions, whereby the back-up rolls resist upward thrust, away from the work, on the projecting shaft assembly.

It is desirable to cool the latter assembly and for such purpose, I have shown an air inlet 70 supported in a bushing 71 in the sleeve 48 threaded on the rear end of the inner shaft. Such inlet comprises a hollow cylinder 72 within which there is a plug 73 having a series of tapered axial ports (Fig. 5) and a fitting 74 for connection to a suitable supply of cooling air. Such air proceeds through the inner shaft and passes from the same into the surrounding space within the outer shaft through a series of openings 75 near the forward end of the inner shaft. It then flows rearwardly inside the outer shaft and then out through another series of openings 76 in the wall portion thereof enclosed by the secondary coil 29, whereby the air also has a cooling effect on the latter. By providing appropriate seals and collection means, liquid cooling could be provided in lieu of such air circulation.

With reference now to Fig 8, the upper roll 2 of the last roll pass has been shown with a seam guide 77, this being usual, and the edges 78 and 79 of the longitudinally advancing tubular blank T next encounter the seam guide 16 of the welder to ensure uniform separation thereof at the region of application of the energy to the blank. By virtue of the pivotal mounting of the welder table, the contactor assembly can be lifted out of the path of the work and, when in use, brought thereagainst with proper contact pressure by the adjusting means described. The path of current in the blank is indicated by the dashed lines 80 extending between the rotary electrodes 59 and 61 around the point of closure 81, determined by the squeeze rolls 5. With high frequency alternation, the current is concentrated in the edges by skin effect and also by the proximity effect of the instantaneous currents flowing in opposite directions in corresponding portions of the spaced edges. Reference numeral 82 indicates the source of high frequency energy to which the primary coil 26 is connected and it will be clear that any suitable available source, such as a tube oscillator, may be employed. Leads 83 and 84 schematically represent the hollow shaft connections between the transformer secondary and the electrodes.

The frequency range will generally be on the order of from about 9600 to about 450,000 cycles per second, with the particular frequency used depending on the type of operation performed. For example, in welding tubing of very small diameter, the frequency may exceed 500,000 cps., while for very large diameters, it may be as low as 2800 cps., but the latter level is quite rare.

It will accordingly be seen that this welder comprises a high frequency transformer having a rotatable secondary assembly which includes roll contactors for engaging the advancing work to apply the energy to the same. Mechanical contact is thus had without excessive wearing through friction and without relative rotation between the contacts and the transformer output means, which would require some form of slide contacts or the like. The transformer of course steps up the current considerably and the positive physical connection of the electrodes is obviously desirable in this type of energy supply.

Other modes of applying the principle of the invention may be employed, change being made as regards the details described, provided the features stated in any of the following claims or the equivalent of such be employed.

I, therefore, particularly point out and distinctly claim as my invention:

1. Apparatus for high frequency electric welding of longitudinally advancing work edges, comprising seam-closing means for forcibly bringing such edges together at a predetermined point in the travel thereof, a rolling contact assembly positioned to engage the work edges in advance of said seam-closing means, said contact assembly including a pair of rotary electrodes and a disc of insulating material therebetween, such disc being of greater diameter than the electrodes to project peripherally therefrom between the work edges to space the same apart with the electrodes respectively in rolling contact with the thus spaced edges, the disc thereby serving as a rotary seam guide cooperable with the seam-closing means to cause the advancing edges between the two to converge progressively to a point of juncture, conductors rigidly connected respectively to and extending from said electrodes in insulated relation, a stationary high frequency transformer primary winding having fixed terminals for connection to a high frequency energy source, a secondary winding having its ends respectively connected to the conductors leading to the rotary electrodes, the contact assembly, conductors and secondary winding forming a unitary curent supply assembly, and means for mounting such unitary current supply assembly for rotation with the secondary winding thereof in inductive relation to the high frequency primary winding.

2. Apparatus as set forth in claim 1 wherein the peripheral portion of said disc projecting from the rotary electrodes between the work edges is tapered in radial section.

3. Apparatus as set forth in claim 1 wherein the conductors between the rotary electrodes and the secondary winding are co-axial and spaced apart for circulation of cooling fluid therebetween.

4. Apparatus as set forth in claim 3 wherein said conductors comprise an inner hollow shaft and an outer sleeve surrounding the same in spaced relation.

5. Apparatus as set forth in claim 4 wherein the means mounting the unitary current supply means includes stabilizing means engaged with the outer sleeve conductor adjacent the contact assembly.

6. Electric welding apparatus comprising a conductor assembly including relatively insulated inner and outer elongated conductive members, a pair of work-contacting rolls supported at one end portion of said conductor assembly respectively in electrical connection with said inner and outer members thereof, means mounting said conductor assembly for rotation on its axis, a single-turn transformer secondary winding in the form of a longitudinally split conductive sleeve disposed co-axially in outward spaced relation about said conductor assembly, first and second rigid plate-like connectors bridging the space between the conductor assembly and outwardly spaced sleeve, said connectors being attached respectively at their outer ends to and along the longitudinal edge portions of the sleeve and at their inner ends to said inner and outer conductive members, whereby said connectors serve to connect the work-contacting rolls to the electrical ends of such sleeve secondary and to support the latter on the conductor assembly for rotation therewith, a transformer primary winding in the form of a coil encircling said sleeve with an air gap between the two, and stationary support means to which said coil is fixed in such encircling relation to the rotatable conductor assembly and secondary winding.

7. Apparatus for high frequency electric welding of longitudinally advancing work edges, comprising seam-closing means for forcibly bringing such edges together at a predetermined point in the travel thereof, a rolling contact assembly positioned to engage the work edges in advance of said seam-closing means, said contact assembly including a pair of rotary electrodes and a disc of insulating material therebetween, conductors rigidly connected respectively to and extending from said electrodes in insulated relation, a stationary high frequency transformer primary winding having fixed terminals for connection to a high frequency energy source, a secondary winding having its ends respectively connected to the conductors leading to the rotary electrodes, the contact assembly, conductors and secondary winding forming a unitary current supply assembly for rotation with the secondary winding thereof in inductive relation to the high frequency primary winding.

8. Apparatus as set forth in claim 7 wherein the conductors between the rotary electrodes and the secondary winding are co-axial and spaced apart for circulation of cooling fluid therebetween.

9. Apparatus as set forth in claim 8 wherein said conductors comprise an inner hollow shaft and an outer sleeve surrounding the same in spaced relation.

10. Apparatus as set forth in claim 9 wherein the means mounting the unitary current supply means includes stabilizing means engaged with the outer sleeve conductor adjacent the contact assembly.

References Cited in the file of this patent

UNITED STATES PATENTS

| Number | Name | Date |
|---|---|---|
| 1,862,296 | Burnish | June 7, 1932 |
| 2,407,676 | Munson | Sept. 17, 1946 |
| 2,550,711 | Morris | May 1, 1951 |
| 2,680,180 | Wordon et al. | June 1, 1954 |
| 2,799,768 | Alldart | July 16, 1957 |
| 2,818,488 | Rudd et al. | Dec. 31, 1957 |
| 2,818,489 | Kalning et al. | Dec. 31, 1957 |

FOREIGN PATENTS

| Number | Country | Date |
|---|---|---|
| 630,763 | Great Britain | Oct. 20, 1949 |